(12) United States Patent
Miyazawa

(10) Patent No.: US 11,449,690 B2
(45) Date of Patent: Sep. 20, 2022

(54) CARD READER AND CONTROL METHOD THEREFOF

(71) Applicant: NIDEC SANKYO CORPORATION, Nagano (JP)

(72) Inventor: Keiji Miyazawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/896,741

(22) Filed: Jun. 9, 2020

(65) Prior Publication Data

US 2020/0387679 A1 Dec. 10, 2020

(30) Foreign Application Priority Data

Jun. 10, 2019 (JP) .............................. JP2019-107794

(51) Int. Cl.
*G06K 7/08* (2006.01)

(52) U.S. Cl.
CPC ................................... *G06K 7/087* (2013.01)

(58) Field of Classification Search
CPC ............ G06K 7/00; G06K 7/08; G06K 7/082; G06K 7/087; G06K 7/088
See application file for complete search history.

(56) References Cited

U.S. PATENT DOCUMENTS

| 8,982,097 B1 * | 3/2015 | Kuzo | G06F 3/04186 |
| | | | 345/174 |
| 2017/0351880 A1 * | 12/2017 | Ozawa | G06K 7/081 |

FOREIGN PATENT DOCUMENTS

JP 2015082307 A 4/2015

OTHER PUBLICATIONS

H. Guo and B. Jin, "Forensic analysis of skimming devices for credit fraud detection," 2010 2nd IEEE International Conference on Information and Financial Engineering, Chongqing, China, 2010, pp. 542-546, doi: 10.1109/ICIFE.2010.5609418. (Year: 2010).*

* cited by examiner

*Primary Examiner* — Matthew Mikels
(74) *Attorney, Agent, or Firm* — Cantor Colburn LLP

(57) ABSTRACT

A card reader may be structured to perform at least one of reading of magnetic data recorded in a card and writing of magnetic data to the card. The card reader may include a metal detection sensor structured to detect a foreign matter including metal, a judgment part configured to compare an output of the metal detection sensor with a predetermined threshold value to determine whether abnormality has occurred or not, and an abnormality determination part configured to obtain a difference between a reference value and an output of the metal detection sensor in a case that the judgment part determines that the abnormality has occurred to determine as the foreign matter in a state that the difference is within a stable determination width.

11 Claims, 3 Drawing Sheets

CARD READER AND CONTROL METHOD THEREFOF

CROSS REFERENCE TO RELATED APPLICATION

The present application claims priority under 35 U.S.C. § 119 to Japanese Application No. 2019-107794 filed on Jun. 10, 2019, and the entire content of which is incorporated herein by reference.

TECHNICAL FIELD

The present invention relates to a card reader structured to perform at least one of reading and writing of magnetic data to a magnetic card and a control method of the card reader.

BACKGROUND

A card reader structured to perform reading of magnetic data recorded in a magnetic card and writing of magnetic data to the magnetic card has been widely used in an ATM (Automated teller machine) and the like. In the card reader, a magnetic head is provided for reading and writing of magnetic data. However, so-called skimming may be performed in which, in addition to a normal magnetic head, an illegal magnetic head is disposed in the card reader by a criminal to illegally acquire magnetic data. In order to detect a skimming act, a technique has been proposed that a metal detection sensor is provided in an inside of the card reader and a foreign matter such as a skimming magnetic head having been disposed is detected by the metal detection sensor. The metal detection sensor has been known which is, for example, structured so that a detection coil and a pair of excitation coils are wound around a core made of magnetic material and, when an object including metal is located in the vicinity of the core, an output voltage from the detection coil is increased. In a state that a magnetic card does not exist in the inside of the card reader, when it is detected whether an output voltage value of the metal detection sensor exceeds a foreign matter detection slice value which is a threshold value or not, presence or absence of a foreign matter can be determined. In Japanese Patent Laid-Open No. 2015-82307 (Patent Literature 1), a technique is disclosed that, in order to detect a foreign matter while compensating for a variation of an output of a metal detection sensor due to change of ambient temperature, instead of simply comparing a foreign matter detection slice value with an output of the metal detection sensor, it is determined that a foreign matter has been detected when a difference "$\Delta V$" between a current measured value "V" by the metal detection sensor and a reference voltage value "Vb" exceeds a reference value "$\Delta Vd$" and, when the difference "$\Delta V$" is not more than a second reference value "$\Delta Vb$", the current measured value "V" itself is set to be the new reference voltage value "Vb" which is used in the next foreign matter detection.

When a magnetic card wetted with water is inserted and pulled out from a card reader, water droplets may be left in the card reader. Alternatively, when a card reader is installed in an environment exposed to wind and rain, water droplets may enter into an inside of the card reader through a card insertion port. When water droplets have entered in the inside of the card reader, the water droplets having entered may be erroneously detected as a foreign matter depending on characteristics of a metal detection sensor.

SUMMARY

In view of the problem described above, at least an embodiment of the present invention may provide a card reader structured to reduce erroneous detection of water entered into an inside of the card reader as a foreign matter, and provide a control method of the card reader.

To solve the above-mentioned problem, at least an embodiment of the present invention may provide a card reader structured to perform at least one of reading of magnetic data recorded in a card and writing of magnetic data to the card. The card reader may include a metal detection sensor structured to detect a foreign matter including metal, a judgment part configured to compare an output of the metal detection sensor with a predetermined threshold value to determine whether abnormality has occurred or not, and an abnormality determination part configured to obtain a difference between a reference value and an output of the metal detection sensor in a case that the judgment part determines that the abnormality has occurred to determine as the foreign matter in a state that the difference is within a stable determination width.

In the card reader in accordance with at least an embodiment of the present invention, when it is determined to be abnormal by comparing an output of the metal detection sensor with a predetermined threshold value, a difference between the output of the metal detection sensor and a reference value for determination is obtained and, when the difference is within a stable determination width, it is determined that a foreign matter exists. Therefore, erroneous detection of water entered in the inside of the card reader as a foreign matter is reduced and reliability of the card reader can be enhanced.

In the card reader in accordance with at least an embodiment of the present invention, it may be preferable that the abnormality determination part determines that the foreign matter exists in a case that the state that the difference is within the stable determination width has continued over a predetermined time period. In a case of erroneous detection due to water, a value of an output of the metal detection sensor is not stable according to a discharge and the like of the water. Therefore, it can be determined that a foreign matter exists when a state that the difference between the output of the metal detection sensor and a reference value for determination is within the stable determination width has continued over a predetermined time period. Accordingly, a foreign matter can be surely detected while erroneous detection is reduced.

In the card reader in accordance with at least an embodiment of the present invention, it may be preferable that the judgment part updates the reference value with the output of the metal detection sensor in a case that the judgment part determines to be no abnormality as a result of comparing the output of the metal detection sensor with the predetermined threshold value. According to this structure, an effect due to a characteristic change of the metal detection sensor with time can be reduced. Further, it may be preferable that the abnormality determination part updates the reference value with the output of the metal detection sensor when the difference exceeds the stable determination width. According to this structure, the reference value for determining whether it is detection of a foreign matter or it is erroneous detection due to water droplets or the like is updated in accordance with an actual circumstance and thus, erroneous detection can be reduced.

Further, at least an embodiment of the present invention may provide a control method of a card reader structured to perform at least one of reading of magnetic data recorded in a card and writing of magnetic data to the card. The control method may include acquiring an output value of a metal detection sensor structured to detect a foreign matter including metal in a state that the card is not inserted into the card reader, judging whether abnormality has occurred or not by comparing the output value with a predetermined threshold value, obtaining a difference between a reference value and an output value of the metal detection sensor when it is determined that the abnormality has occurred, and determining that a foreign matter exists when the difference is within a stable determination width.

According to the control method of at least an embodiment of the present invention, an output value of the metal detection sensor is compared with a predetermined threshold value and thereby, when it is determined to be abnormal, a difference between the output value of the metal detection sensor and a reference value for determination is obtained and, when the difference is within a stable determination width, it is determined that a foreign matter exists. Therefore, erroneous detection of water entered in the inside of the card reader as a foreign matter is reduced and reliability of the card reader is enhanced.

In the control method in accordance with at least an embodiment of the present invention, it may be preferable that the output value is repeatedly acquired at a predetermined time interval in a state that the card is not inserted into the card reader. When the output value of the metal detection sensor is repeatedly acquired at a predetermined time interval, in an existing card reader whose control part is, for example, configured of a microprocessor, the control method of at least an embodiment of the present invention can be executed without adding or changing the hardware. Further, in the control method in accordance with at least an embodiment of the present invention, it may be preferable that it is determined that a foreign matter exists in a case that the state that the difference is within the stable determination width has continued over a predetermined time period. In a case of erroneous detection due to water, a value of the output value of the metal detection sensor is not stable according to discharge and the like of the water. Therefore, it can be determined that a foreign matter exists when a state that the difference between the output value of the metal detection sensor and a reference value for determination is within the stable determination width has continued over a predetermined time period. Accordingly, a foreign matter can be surely detected while erroneous detection is reduced.

In the control method in accordance with at least an embodiment of the present invention, it may be preferable that, in a case that it is not determined to be abnormal as a result of comparing the output value with the threshold value, the reference value is updated with the output value. According to this method, an effect due to a characteristic change of the metal detection sensor with time can be reduced. Further, it may be preferable that the reference value is updated with the output value when the difference exceeds the stable determination width. According to this method, the reference value for determining whether it is detection of a foreign matter or it is erroneous detection due to water droplets or the like can be updated in accordance with an actual circumstance and thus, erroneous detection can be reduced.

Effects of the Invention

According to at least an embodiment of the present invention, erroneous detection of water entered in the inside of the card reader as a foreign matter is reduced and reliability of the card reader is enhanced.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
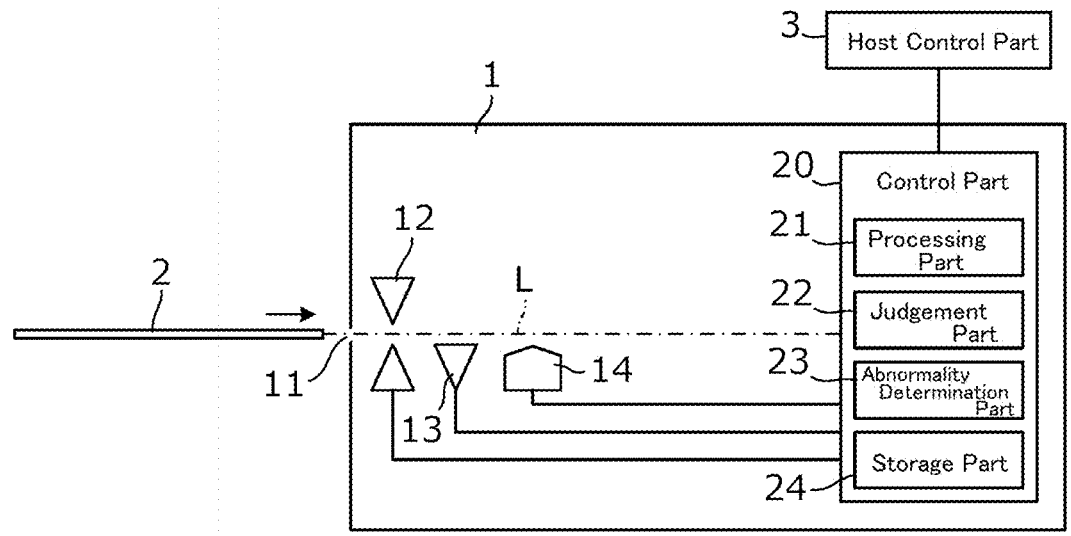
FIG. 1 is a schematic view showing a structure of a card reader in accordance with an embodiment of the present invention.

A preferred embodiment of the present invention will be described below with reference to the accompanying drawings. FIG. 1 shows a card reader in accordance with an embodiment of the present invention. A card reader 1 shown in FIG. 1 is structured to perform at least one of reading of magnetic data recorded in a card 2, which is a magnetic card, and recording of magnetic data to the card 2. The card reader 1 is, for example, mounted on a host apparatus such as an ATM and exchanges data with a host control part 3 of the host apparatus, and the card reader 1 is controlled by the host control part 3. A card 2 is, for example, made of vinyl chloride, polyethylene terephthalate or paper having an appropriate thickness, and the card 2 is a general card whose rear face is formed with a magnetic stripe in which magnetic data are recorded. The card 2 may be a so-called IC (integrated circuit) card with a magnetic stripe in which an IC chip is embedded. In the following descriptions, the card reader 1 is a so-called dip type card reader in which a card 2 is manually inserted into an inside of the device by a user and the card 2 is pulled out from the device to perform reading and writing of magnetic data to the card 2. However, a card reader to which the present invention is applied is not limited to a dip type card reader. The present invention may be applied to a card reader which has a risk of skimming, for example, a motor type card reader.

The card reader 1 includes an insertion port 11 to which a card 2 is inserted and the card reader 1 is structured so that a card 2 inserted through the insertion port 11 is capable of moving in an inside of the card reader 1 along a conveyance passage "L". The inside of the card reader 1 is, along the conveyance passage "L", provided with a card sensor 12 structured to detect presence or absence of a card 2 inserted to the card reader 1, a metal detection sensor 13 structured to detect a foreign matter illegally disposed in the inside of the card reader 2, and a normal magnetic head 14 structured to perform reading and writing of magnetic data to a magnetic stripe of the card 2. The metal detection sensor 13 is structured to detect a foreign matter including metal and is, for example, structured so that a detection coil and a pair of excitation coils to which an alternating current having a predetermined frequency is supplied are wound around a core which is made of magnetic material. The metal detection sensor 13 is structured so that a voltage induced in the detection coil becomes large when a foreign matter including metal exists in the vicinity of the metal detection sensor 13 in comparison with a case that a foreign matter does not exist. The metal detection sensor 13 converts an AC (alternating current) voltage induced in the detection coil into a DC (direct current) voltage and outputs it.

The card reader 1 further includes a control part 20 which is connected with the host control part 3 and controls reading and writing of magnetic data to a card 2 and controls an operation of the card reader 1. The control part 20 is connected with the magnetic head 14, and a detection result of the card sensor 12 and a detection result of the metal detection sensor 13 are also inputted to the control part 20. The control part 20 includes a processing part 21 configured to read and write magnetic data to a card 2 by the magnetic head 14 through control of the host control part 3, a judgment part 22 configured to compare a voltage "V" which is a current measured value of the metal detection sensor 13 with a foreign matter detection slice value "Ve" which is a predetermined threshold value to determine presence or absence of abnormality, and an abnormality determination part 23 configured to obtain a difference between the current voltage "V" and a reference value "Vd" when the judgment part 22 has determined to be abnormal. The abnormality determination part 23 is further configured to determine whether an absolute value of the difference is within a stable determination width "Vs" or not, that is, whether the expression "|"V"–"Vd"| "Vs"" is satisfied or not and, when the expression "|"V"–"Vd"| "Vs"" is satisfied, the abnormality determination part 23 determines that a foreign matter has been detected. Further, the control part 20 also includes a storage part 24 which stores programs and data necessary for processing in the control part 20.

In the control part 20, each of the processing part 21, the judgment part 22, the abnormality determination part 23 and the storage part 24 may be structured as an individual hardware element. However, in this embodiment, the entire control part 20 is configured of a microprocessor, and the processing part 21, the judgment part 22 and the abnormality determination part 23 can be realized by executing software corresponding to these functions on the microprocessor.

Figure 2:
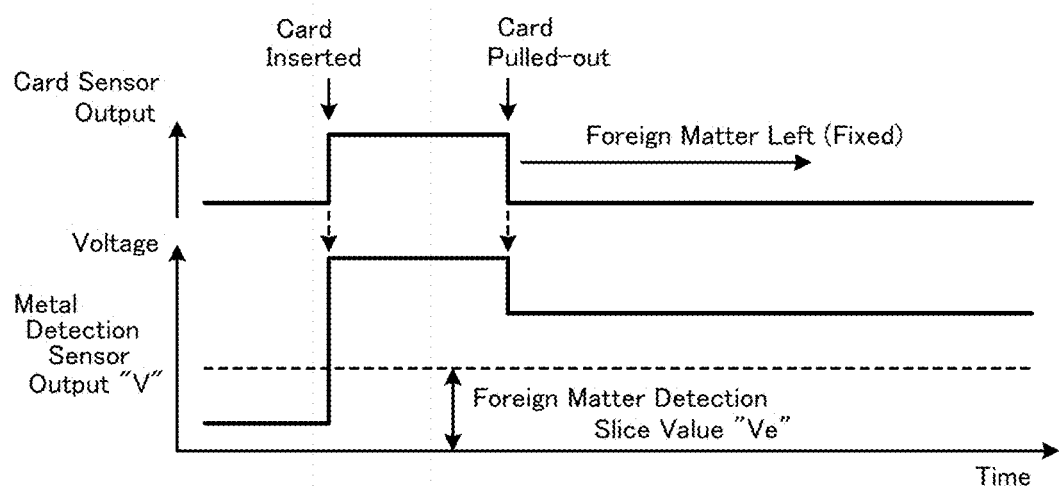
FIG. 2 is a waveform diagram showing an example of outputs of a card sensor and a metal detection sensor.
Figure 3:
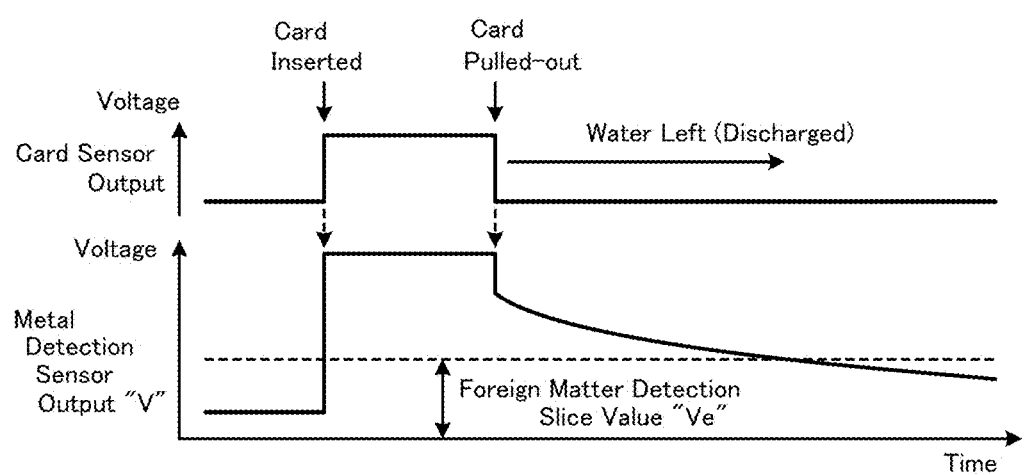
FIG. 3 is a waveform diagram showing another example of outputs of a card sensor and a metal detection sensor.

FIGS. 2 and 3 are views for explaining foreign matter detection in this embodiment and show time variations of an output of the card sensor 12 and an output "V" of the metal detection sensor 13. An output of the card sensor 12 rises when a card 2 is inserted into the card reader 1. The output of the card sensor 12 returns to the original value when the card 2 is pulled out from the card reader 1. The output "V" of the metal detection sensor 13 also rises when the card 2 is inserted into the card reader 1. When the card 2 is pulled out from the card reader 1, the output "V" should also return to the original value. On the other hand, it is conceivable that a foreign matter such as a skimming magnetic head is inserted into the card reader 1 together with a card 2 and, after that, only the card 2 is pulled out to dispose the foreign matter in the inside of the card reader 1. As a result, after a foreign matter is brought into the inside of the card reader 1 together with a card 2, when only the card 2 is pulled out from the card reader 1, the foreign matter is left and thus, an output "V" of the metal detection sensor 13 does not return to the original value before insertion of the card 2 as shown in FIG. 2, and the output "V" of the metal detection sensor 13 indicates a large constant voltage value after the card 2 has been pulled out. The output "V" of the metal detection sensor 13 in this case is larger than a foreign matter detection slice value "Ve".

Water droplets causing erroneous detection in foreign matter detection is conceivable that, for example, water droplets are brought into an inside of the card reader 1 by insertion of a wetted card 2 into the card reader 1 and the water droplets are left in the inside of the card reader 1 when the card 2 has been pulled out. However, a card reader 1 which is used under a condition that water droplets and the like are assumed to enter is commonly provided with a drain mechanism. Therefore, even when water enters into an inside of the card reader 1, the water is gradually discharged, and an amount of the water left in the card reader 1 decreases as time passes. The metal detection sensor 13 also reacts to water droplets and thus, an output "V" of the metal detection sensor 13 indicates a large voltage value exceeding the foreign matter detection slice value "Ve" as shown in FIG. 3 immediately after the card 2 is pulled out. However, the output "V" of the metal detection sensor 13 gradually decreases as the water is discharged from the card reader 1. In FIG. 3, although apart of the output "V" is shown, if contribution of variation of a characteristic of the metal detection sensor 13 due to change of ambient temperature is ignored, the output "V" of the metal detection sensor 13 is considered to be finally converged to an original value before the card 2 is inserted.

Further, according to examination of the present inventor, a variation width of the output "V" of the metal detection sensor 13 due to detection of a foreign matter is found within a stable determination width "Vs". In other words, an output of the metal detection sensor 13 when a foreign matter does not exist in an inside of the card reader 1 is defined as a reference value "Vd" and, after a card 2 is inserted and pulled out from the card reader 1, even in a case that the output "V" of the metal detection sensor 13 exceeds the foreign matter detection slice value "Ve" and thus, even in a case that a foreign matter may be considered to be existed, when the expression "|"V"–"Vd"|>"Vs"" is satisfied, it is determined that a foreign matter does not exist and it is erroneous detection due to water droplets. Therefore, in the card reader 1 in this embodiment, a voltage "V" of the output of the metal detection sensor 13 and the foreign matter detection slice value "Ve" are compared with each other in the judgment part 22 and, when "V">"Ve", it is determined to be abnormal. When the judgment part 22 determines that it is abnormal, the abnormality determination part 23 calculates and obtains a difference between a current voltage "V" of the output of the metal detection sensor 13 and the reference value "Vd". When the absolute value of the difference is within the stable determination width "Vs", in other words, when the expression "|"V"–"Vd"|≤"Vs"" is satisfied, it is determined that a foreign matter has been detected.

Figure 4:
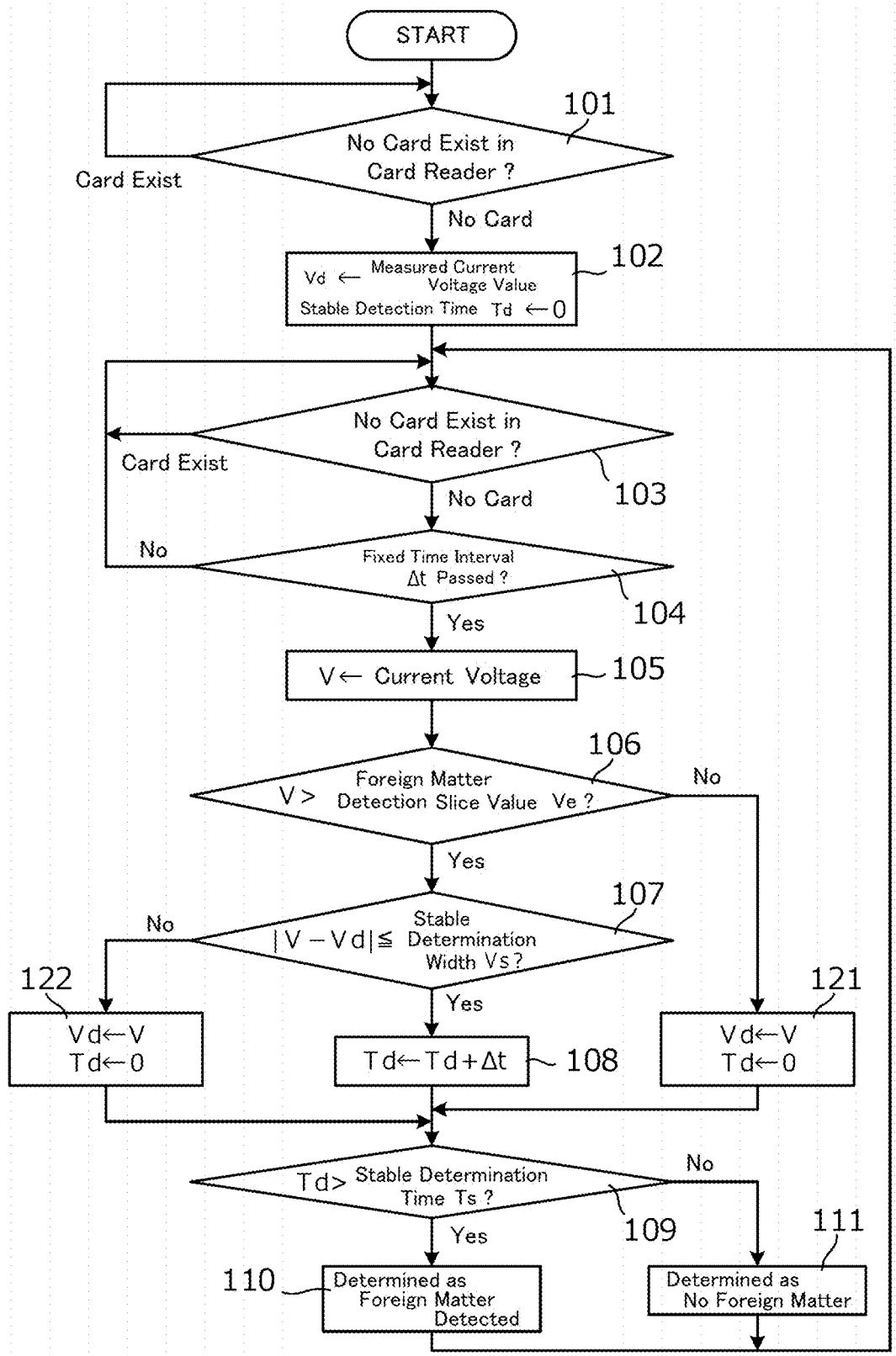
FIG. 4 is a flow chart for explaining processing for detecting a foreign matter.

In addition, in this embodiment, in a case that matter which has been detected by the metal detection sensor 13 is not a foreign matter but water droplets, the output "V" of the metal detection sensor 13 varies and, typically, decreases gradually. Therefore, determination of a foreign matter can be performed by taking a variation with time of the output "V" into consideration. FIG. 4 shows steps of processing which performs a foreign matter determination by taking a variation with time of the output "V" into consideration. First, the control part 20 executes steps 101 and 102 as an initialization process. In the step 101, the control part 20 confirms that a card 2 does not exist in an inside of the card reader 1 based on an output of the card sensor 12. Alternatively, the control part 20 waits a state that a card 2 does not exist in the inside of the card reader 1. When there becomes a state that a card 2 does not exist in the inside of the card reader 1, in the step 102, a current measured voltage value of the metal detection sensor 13 is set as a reference value "Vd" and a stable detection time "Td" is cleared to zero.

Subsequently, in order to detect a foreign matter for each fixed time interval "Δt" in a state that a card 2 does not exist in the inside of the card reader 1, the control part 20 confirms that no card 2 exists in the inside of the card reader 1 in step 103. When a card 2 exists, the control part 20 repeats the step 103 and waits until the card 2 is pulled out from the card reader 1 and, after that, the control part 20 determines whether the fixed time interval "Δt" has passed or not in step 104 and, when the fixed time interval "Δt" has not passed, the step 103 is executed again. In the step 104, when the fixed time interval "Δt" has passed, the judgment part 22 sets a current voltage of the output of the metal detection sensor 13 as the voltage "V" in step 105, and the voltage "V" and the foreign matter detection slice value "Ve" are compared with each other in step 106. In the step 106, when the expression ""V">"Ve"" is satisfied, the judgment part 22 determines to be abnormal, and next, the abnormality determination part 23 determines whether the expression "|"V"–"Vd"|≤"Vs"" is satisfied or not in step 107. In a case that the expression "|"V"–"Vd"|≤"Vs"" is satisfied, in order to determine whether this situation continues over a stable determination time "Ts" or not, the abnormality determination part 23 updates the stable detection time "Td" by adding the time interval "Δt" in step 108 and, in step 109, the abnormality determination part 23 determines whether the stable detection time "Td" exceeds the stable determination time "Ts" or not. The stable detection time "Td" is a parameter which indicates a duration time of a state that the expression "|"V"–"Vd"|≤"Vs"" is satisfied. The abnormality determination part 23 determines in step 110 that a foreign matter has been detected when the expression ""Td">"Ts"" is satisfied and, when the expression ""Td"≤"Ts"" is satisfied, the abnormality determination part 23 determines in step 111 that a foreign matter has not been detected. When it is determined in the step 110 that a foreign matter has been detected, the abnormality determination part 23 executes an appropriate abnormality process such as an alarm notification to the host control part 3 of the host apparatus. When it is determined in the step 111 that a foreign matter has not been detected, the card reader 1 continues normal processing. After the step 110 or the step 111 has been executed, the processing returns to the step 103 for repeating the processing of foreign matter detection. Therefore, in a state that a foreign matter actually exists, even in a case that, as a result that the step 109 has executed at a certain time point, it may be determined that a foreign matter has not been detected due to that the expression ""Td"≤"Ts"" is satisfied, since the processing of foreign matter detection is repeated, after that, as a result of the execution of the step 109 again, when the expression ""Td">"Ts"" is satisfied with passage of time, it is determined that a foreign matter has been detected.

When the expression "V" "Ve" is satisfied in the step 106, in other words, when a current voltage "V" is not more than the foreign matter detection slice value "Ve", the judgment part 22 updates the reference value "Vd" with the current voltage "V" in step 121 and clears the stable detection time "Td" to zero. In this case, the expression ""V"≤"Ve"" is satisfied and thus, it is a normal state. Therefore, when the reference value "Vd" is updated with the current voltage "V" at this time, variation of characteristic of the metal detection sensor 13 due to change of ambient temperature and the like can be compensated and thus, effects due to change with time can be reduced in subsequent foreign matter detection. After the step 121 is executed, the processing advances to the step 109. In this case, the stable detection time "Td" is set to be zero in the step 121 and thus, the processing in the step 109 always advances to the step 111, in other words, to a side of no foreign matter detection.

When the expression "|"V"–"Vd"|>"Vs"" is satisfied in the step 107, in other words, in a case that the abnormality determination part 23 determines that a foreign matter has not been detected without considering the stable detection time "Td", the abnormality determination part 23 updates the reference value "Vd" with the current voltage "V" and clears the stable detection time "Td" to zero in step 122. The reference value "Vd" for determining whether a foreign matter has been detected or it is erroneous detection due to water droplets or the like is updated and thus, erroneous detection in subsequent foreign matter detection can be further reduced. After the step 122 is executed, the processing advances to the step 109. In this case, the stable detection time "Td" is set to be zero in the step 122 and thus, the processing in the step 109 advances to the step 111, in other words, to a side of no foreign matter detection.

In the card reader 1 in this embodiment, the stable determination width "Vs" and the stable determination time "Ts" are previously determined in consideration of drain performance of the card reader 1 for entering of water, sensitivity of the metal detection sensor 13 and the like. Especially, the stable determination width "Vs" is previously set within a range that does not exceed an absolute value of the foreign matter detection slice value "Ve". In a case that the foreign matter detection slice value "Ve" is, for example, +70 mV, the stable determination width "Vs" is, for example, set to be 5 mV. The stable determination time "Ts" is, for example, set to be 15 seconds. In the descriptions described above, the metal detection sensor 13 is used whose output value or output voltage increases when a foreign matter including metal is detected. However, the metal detection sensor 13 which can be utilized in the present invention may be, for example, a sensor whose output value or output voltage decreases when a foreign matter including metal is detected. When the metal detection sensor 13 whose output value decreases when a foreign matter including metal is detected is to be used, an appropriate foreign matter detection slice value "Ve" is previously set and then, it is determined whether the expression ""V"<"Ve"" is satisfied or not in the step 106. Further, as described in the above-mentioned Patent Literature 1, even in a case that a foreign matter is detected based on a variation of an output of the metal detection sensor 13, the foreign matter detection in accordance with the present invention may be applied.

According to the embodiment described above, in a case that it is determined to be abnormal based on a comparison result between an output value of the metal detection sensor and the foreign matter detection slice value, detection for a foreign matter is performed by utilizing that an output of the metal detection sensor and behavior of its variation is different according to whether a foreign matter including metal has been actually detected or water droplets have been erroneously detected. Therefore, presence or absence of a foreign matter in an inside of the card reader 1 can be stably and surely determined while avoiding an effect due to entering of water. Further, when the control part 20 is configured of a microprocessor, a hardware structure of an existing card reader is not desired to change and thus erroneous detection due to entering of water can be reduced while suppressing its cost.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader structured to perform at least one of reading of magnetic data recorded in a card and writing of magnetic data to the card, the card reader comprising:
a metal detection sensor structured to detect a foreign matter including metal;
a judgment part configured to compare a current output of the metal detection sensor with a predetermined threshold value to determine whether abnormality has occurred or not; and
an abnormality determination part configured to obtain a difference between a reference value and a current output of the metal detection sensor in a case that the judgment part determines that the abnormality has occurred to determine as the foreign matter in a state that the difference is within a stable determination width being set in advance within a range not exceeding the predetermined threshold,
wherein the abnormality determination part determines that the foreign matter exists in a case that the state that the difference is within the stable determination width has continued over a stable determination time period,
the abnormality determination part determines that the current output is affected by water droplets rather than a foreign substance when the difference is larger than the predetermined threshold and fluctuates beyond the stable determination width within the stability judgment time, and
the stable determination time period is predetermined in consideration of a drainability of the card reader against flooding and sensitivity of the metal detection sensor.

2. The card reader according to claim 1, wherein the judgment part updates the reference value with the output of the metal detection sensor in a case that the judgment part determines to be no abnormality as a result of comparing the output of the metal detection sensor with the predetermined threshold value.

3. The card reader according to claim 1, wherein the abnormality determination part updates the reference value with the output of the metal detection sensor when the difference exceeds the stable determination width.

4. A control method of a card reader structured to perform at least one of reading of magnetic data recorded in a card and writing of magnetic data to the card, the control method of the card reader comprising:
acquiring an output value of a metal detection sensor structured to detect a foreign matter including metal in a state that the card is not inserted into the card reader;
judging whether abnormality has occurred or not by comparing a current output value with a predetermined threshold value;
obtaining a difference between a reference value and the current output value of the metal detection sensor when it is determined that the abnormality has occurred; and
determining that a foreign matter exists when the difference is within a stable determination width being set in advance within a range not exceeding the predetermined threshold,
wherein it is determined that the foreign matter exists in a case that the state that the difference is within the stable determination width has continued over a stable determination time period,
determining that the current output is affected by water droplets rather than a foreign substance when the difference is larger than the predetermined threshold and fluctuates beyond the stable determination width within the stability judgment time, and
the stable determination time period is predetermined in consideration of a drainability of the card reader against flooding and sensitivity of the metal detection sensor.

5. The control method according to claim 4, wherein the output value is repeatedly acquired at a predetermined time interval in a state that the card is not inserted into the card reader.

6. The control method according to claim 4, wherein the reference value is updated with the output value in a case that it is determined to be no abnormality as a result of comparing the output value with the threshold value.

7. The control method according to claim 4, wherein the reference value is updated with the output value when the difference exceeds the stable determination width.

8. The control method according to claim 7, wherein the reference value is updated with the output value in a case that it is determined to be no abnormality as a result of comparing the output value with the threshold value.

9. The control method according to claim 8, wherein the reference value is updated with the output value when the difference exceeds the stable determination width.

10. The card reader according to claim 1, wherein the judgment part updates the reference value with the output of the metal detection sensor in a case that the judgment part determines to be no abnormality as a result of comparing the output of the metal detection sensor with the threshold value.

11. The card reader according to claim 10, wherein the abnormality determination part updates the reference value with the output of the metal detection sensor when the difference exceeds the stable determination width.

* * * * *